United States Patent
Bressler et al.

(10) Patent No.: US 11,840,014 B2
(45) Date of Patent: Dec. 12, 2023

(54) AUTOMATED 3D-PRINTING OF HOLLOW OBJECTS

(71) Applicant: STRATASYS LTD., Rehovot (IL)

(72) Inventors: Yoav Bressler, Tel-Aviv (IL); Yaniv Shitrit, Ashkelon (IL); Naftali Emanuel Eder, Kiryat Gat (IL)

(73) Assignee: STRATASYS LTD., Rehovot (IL)

( * ) Notice: Subject to any disclaimer, the term of this patent is extended or adjusted under 35 U.S.C. 154(b) by 39 days.

(21) Appl. No.: 17/278,589

(22) PCT Filed: Sep. 25, 2019

(86) PCT No.: PCT/IL2019/051061
§ 371 (c)(1),
(2) Date: Mar. 22, 2021

(87) PCT Pub. No.: WO2020/065650
PCT Pub. Date: Apr. 2, 2020

(65) Prior Publication Data
US 2021/0347108 A1    Nov. 11, 2021

Related U.S. Application Data

(60) Provisional application No. 62/736,473, filed on Sep. 26, 2018.

(51) Int. Cl.
*B29C 64/118* (2017.01)
*B33Y 10/00* (2015.01)
(Continued)

(52) U.S. Cl.
CPC .......... *B29C 64/118* (2017.08); *B29C 64/386* (2017.08); *B29C 64/40* (2017.08);
(Continued)

(58) Field of Classification Search
CPC .............................. B29C 64/386; B29C 64/40
See application file for complete search history.

(56) References Cited

U.S. PATENT DOCUMENTS 8,865,047 B2 * 10/2014 Sella ...................... B29C 31/10
264/308

FOREIGN PATENT DOCUMENTS

EP    2384882    11/2011
EP    3069805    9/2016
(Continued)

OTHER PUBLICATIONS

Search Report dated Dec. 20, 2019 for corresponding International Application No. PCT/IL2019/051061.

*Primary Examiner* — Alex A Rolland
(74) *Attorney, Agent, or Firm* — PEARL COHEN ZEDEK LATZER BARATZ LLP

(57) ABSTRACT

Methods, particularly automated methods, are provided, as well as 3D-printed composite and hollow objects and 3D-printing systems for printing them. Methods comprise deriving a central line of a hollow 3D object model, calculating reference point(s) and/or line(s) along an inner surface of the hollow 3D object model, and filling the hollow 3D object model with material that comprises a thread defined with respect to the central line and the reference point(s) and/or line(s) and with filling material surrounding the thread. The support construction thus formed may be removed from the 3D object by pulling on the thread, extracting it and the surrounding support filling from the hollow object, thus enabling 3D-printing of convoluted or elongated hollow objects and objects with narrow openings. The parameters of the thread, such as type of curve and thickness, are selected to ensure thread extraction without risk of tearing or knotting the thread.

12 Claims, 8 Drawing Sheets

(51) Int. Cl.
  *B33Y 80/00* (2015.01)
  *B29C 64/386* (2017.01)
  *B29C 64/40* (2017.01)
  *B33Y 50/00* (2015.01)
  *B29L 24/00* (2006.01)

(52) U.S. Cl.
  CPC .............. *B33Y 10/00* (2014.12); *B33Y 50/00* (2014.12); *B33Y 80/00* (2014.12); *B29L 2024/00* (2013.01)

(56) References Cited

FOREIGN PATENT DOCUMENTS

| | | | | |
|---|---|---|---|---|
| EP | 3219418 | | 9/2017 | |
| GB | 2517490 | | 2/2015 | |
| GB | 2517490 | A * | 2/2015 | ............ B22F 3/1055 |

* cited by examiner

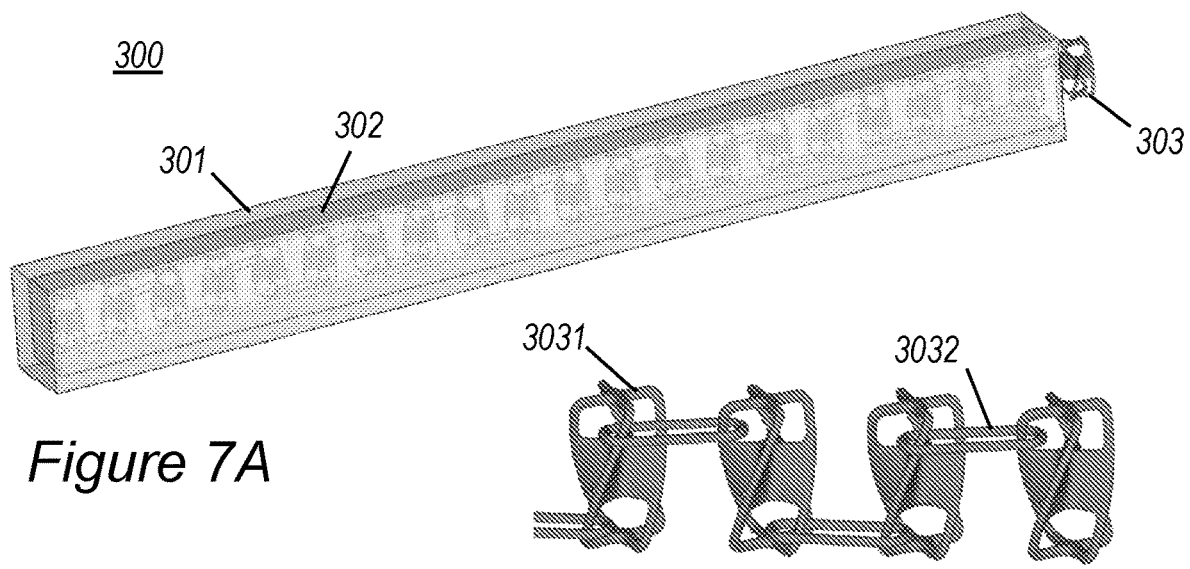
Figure 7A
Figure 7B
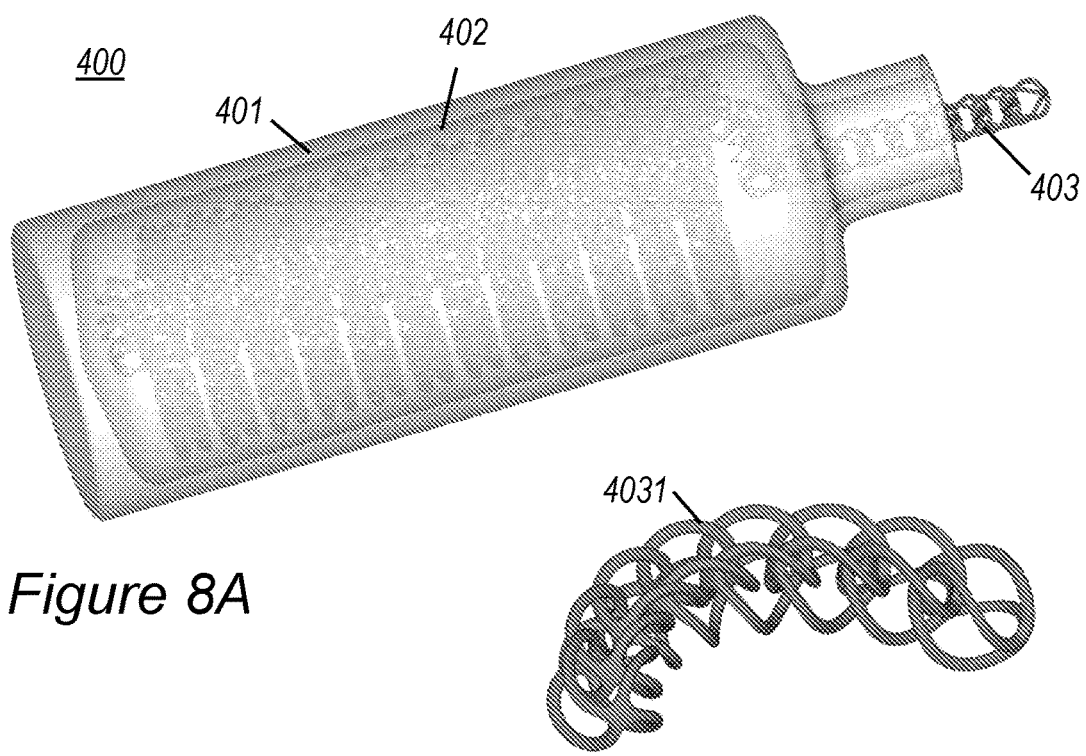
Figure 8A
Figure 8B

AUTOMATED 3D-PRINTING OF HOLLOW OBJECTS

CROSS-REFERENCE TO RELATED APPLICATIONS

This application is a National Phase Application of PCT International Application No. PCT/IL2019/051061, International Filing Date Sep. 25, 2019, claiming the benefit of U.S. Provisional Patent Application No. 62/736,473, filed Sep. 26, 2018, which is hereby incorporated by reference.

BACKGROUND OF THE INVENTION

1. Technical Field

The present invention relates to the field of 3D (three dimensional) printing, and more particularly, to 3D-printing of hollow objects.

2. Discussion of Related Art

U.S. Pat. No. 8,865,047, which is incorporated herein by reference in its entirety, teaches a support construction and a method of creating a support construction in a volume generated by solid freeform fabrication, where the support construction includes layers of supporting materials, such layers comprising a continuous strip of material within such volume such that when the strip is lifted or pulled, the layers of supporting materials including the strip are removed together from the volume

SUMMARY OF THE INVENTION

The following is a simplified summary providing an initial understanding of the invention. The summary does not necessarily identify key elements nor limits the scope of the invention, but merely serves as an introduction to the following description.

A method according to the invention allows creation of an internal support construction in a hollow 3D object model by computing a skeleton of the hollow 3D object model by: (i) representing the hollow 3D object model with approximated cylindrical sections; (ii) calculating the axis of each of the approximated cylindrical sections; and (iii) connecting the calculated axes. A central line of the hollow 3D object model is derived by simplifying the computed skeleton according to specified requirements such as curvature radius thresholds, twisting threshold or length threshold. A reference line along an inner surface of the hollow 3D object model is calculated by maintaining a distance of the reference line from the central line within specified boundaries; and the internal support construction is created by filling the hollow 3D object model with support material that comprises a thread defined with respect to the central line and to the reference line, and with filling material surrounding the thread. The method is carried out by at least one computer processor.

In some embodiments, the method further comprises calculating a reference line along the inner surface of the hollow 3D object model and defining the thread with further respect to the reference line.

In some embodiments, the method further comprises defining the thread as a curve that winds back and forth between the central line and the reference line.

In some embodiments, the method further comprises defining the thread as a spiral extending along the central line at distances defined by the reference line.

In some embodiments, the method further comprises defining the thread as a Lissajous curve extending along the central line at distances defined by the reference line.

In some embodiments, the method further comprises defining the thread to extend a skeleton of the hollow 3D object model, wherein the at least one reference point is used to define at least one direction of the skeleton extension.

In some embodiments, the method further comprises comprising defining a thickness of the thread with respect to distances between adjacent thread windings.

In some embodiments, the method further comprises defining a thickness of the thread with respect to a specified curvature radius defined according to a tensile strength of specified thread material, wherein the thickness is defined to exceed the specified curvature radius along the thread.

In some embodiments, the thickness is defined with respect to at least one parameter relating to a whole of the thread.

In some embodiments, the method further comprises filling gaps between the hollow 3D object model and the thread with a filling material, wherein the filling material has a tensile strength which is lower than that of the thread.

In some embodiments, the thread has a chain structure.

In some embodiments, the chain structure is made of a non-elastomeric material.

Another aspect of the present invention may provide a computer program product comprising a non-transitory computer readable storage medium having computer readable program embodied therewith, the computer readable program configured to carry out the method.

Another aspect of the present invention may provide a 3D modelling system comprising the computer program product.

Another aspect of the present invention may provide a composite 3D-printed object, comprising: a hollow 3D-printed object which corresponds to a given hollow 3D object model, and 3D-printed support material filling the hollow 3D printed object, the support material comprising (i) a thread made of a material having a tensile strength that enables pulling the thread out of the hollow 3D-printed object without tearing the thread or (ii) a thread having a non-elastomeric chain structure, and filling material having a tensile strength lower than the material of the thread.

In some embodiments, the thread is defined with respect to a central line of the hollow 3D object model and at least one reference point on an inner surface of the hollow 3D object model.

In some embodiments, the thread is defined with respect to a central line of the hollow 3D object model and a reference line along an inner surface of the hollow 3D object model.

In some embodiments, the thread follows a curve, which is a spiral, or a Lissajous curve or a combination thereof, that winds back and forth between the central line and the reference line.

In some embodiments, the thread has a thickness selected to fill at least 50% of the hollow 3D-printed object by the thread, and to maintain a curvature radius of the thread below a specified curvature radius that relates to a tearing risk of the thread.

In some embodiments, the thread is defined to extend a skeleton of the hollow 3D object model along at least one direction defined using the at least one reference point.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 7A-7B are three-dimensional representations of a hollow object comprising a solid chain support construction according to an embodiment of the invention; and FIGS. 8A-8B are three-dimensional representations of a hollow object comprising a solid chain support construction according to another embodiment of the invention.

Figure 1:
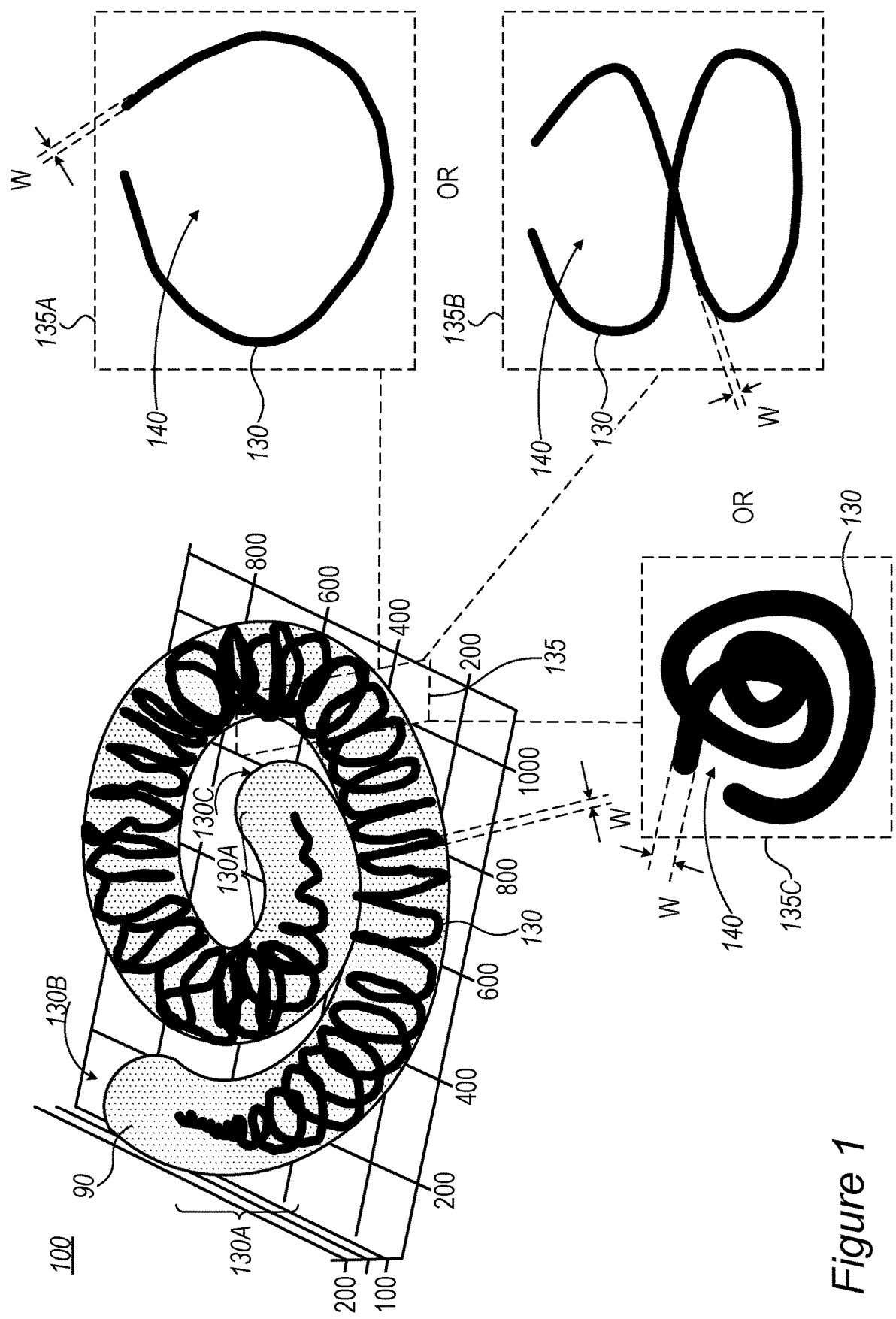
FIGS. 1-4 are high-level schematic illustrations of the derivation of an extractable support material thread to fill a hollow 3D object model, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing", "deriving" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In certain embodiments, illumination technology may comprise, electromagnetic radiation in the visual range, ultraviolet or even shorter wave radiation such as x rays, and possibly even particle beams.

Embodiments of the present invention provide efficient and economical methods and mechanisms for 3D-printing hollow objects and thereby provide improvements to the technological field of 3D printing. Additive manufacturing of intricate and complicated shaped objects, e.g., objects with hollows (e.g., a cavity within an object having one or more openings), especially convoluted objects, branched objects and objects with narrow opening(s), is hindered, in the prior art, by the problem of support removal. For example, when manufacturing hollow objects using inkjet technology, support structure(s) are required to fill the cavity, and subsequently to be cleaned (removed) from the cavity. When the geometry of the cavity is complex (e.g., long, convoluted), cleaning is difficult using traditional methods such as water jet, immersion in corrosive liquid, etc. Disclosed embodiments provide automated methods for constructing internal supports (e.g., in the form of threads, or possibly laces, chains etc.) that can be pulled out of the cavity to simplify cleaning the 3D-printed hollow objects. Disclosed algorithms may create a 3D structure of a prescribed shape to be additively manufactured within a 3D object model, to facilitate removal of the internal support from the object, upon completion of its 3D-printing.

Methods, particularly automated methods, are provided, as well as 3D-printed composite and hollow objects and 3D-printing systems for printing them. Methods comprise deriving a central line of a hollow 3D object model, calculating reference point(s) and/or line(s) along an inner surface of the hollow 3D object model, and filling the hollow 3D object model with material (e.g., supporting materials) that comprises a thread defined with respect to the central line and the reference point(s) and/or line(s) and with filling material surrounding the thread. The support construction thus formed may be removed from the 3D object by pulling on the thread, extracting it and the surrounding support filling from the hollow object, thus enabling 3D-printing of convoluted objects, objects with narrow openings, elongated tube-like objects made of hard or soft material etc. The parameters of the thread, such as type of curve and thickness, may be selected to ensure thread extraction without risk of tearing or knotting the thread. Disclosed methods may be implemented automatically, or some manual adjustments such as parameter selection may be applied to fine tune the methods.

Figure 2:
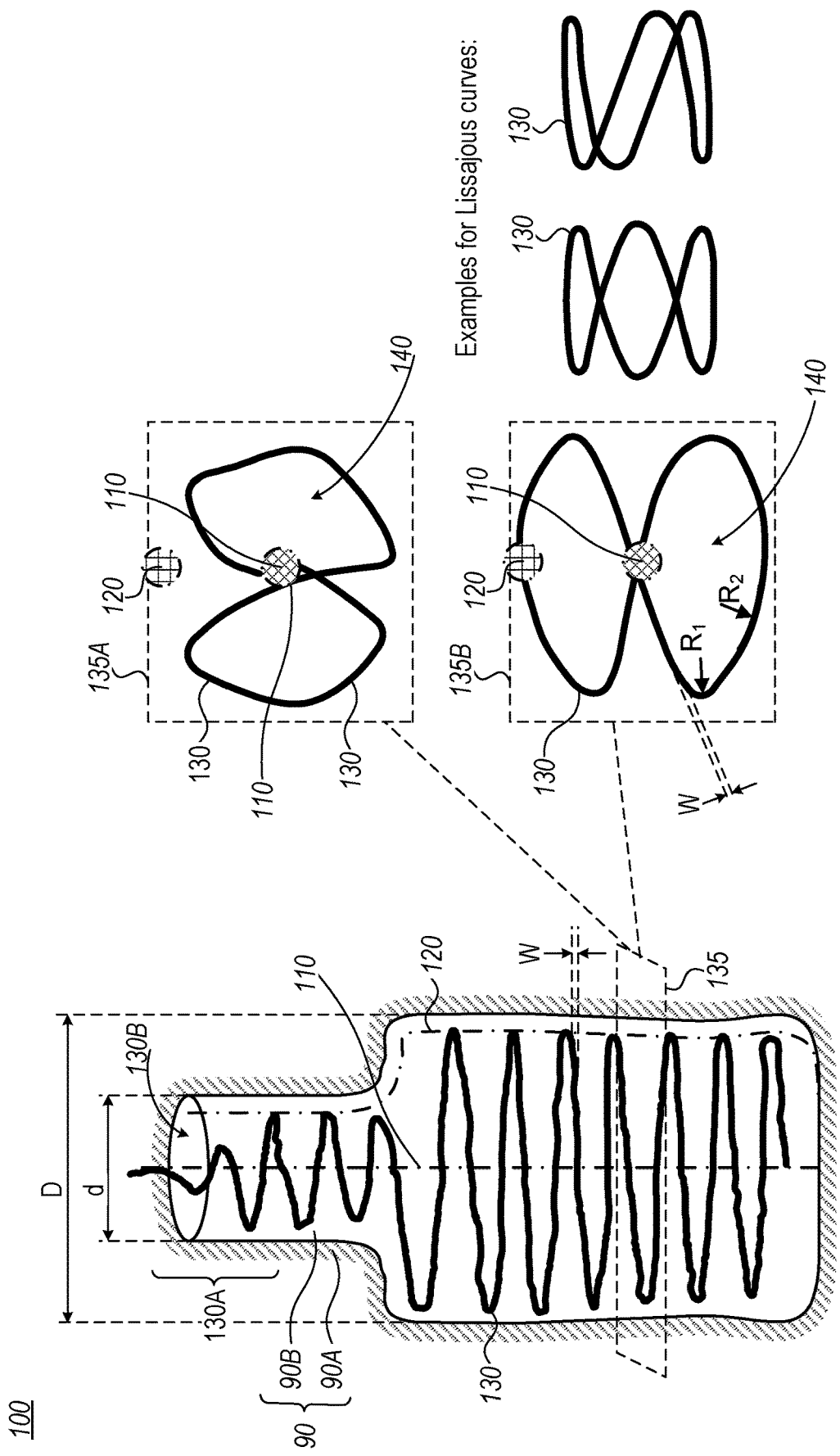
Figure 3:
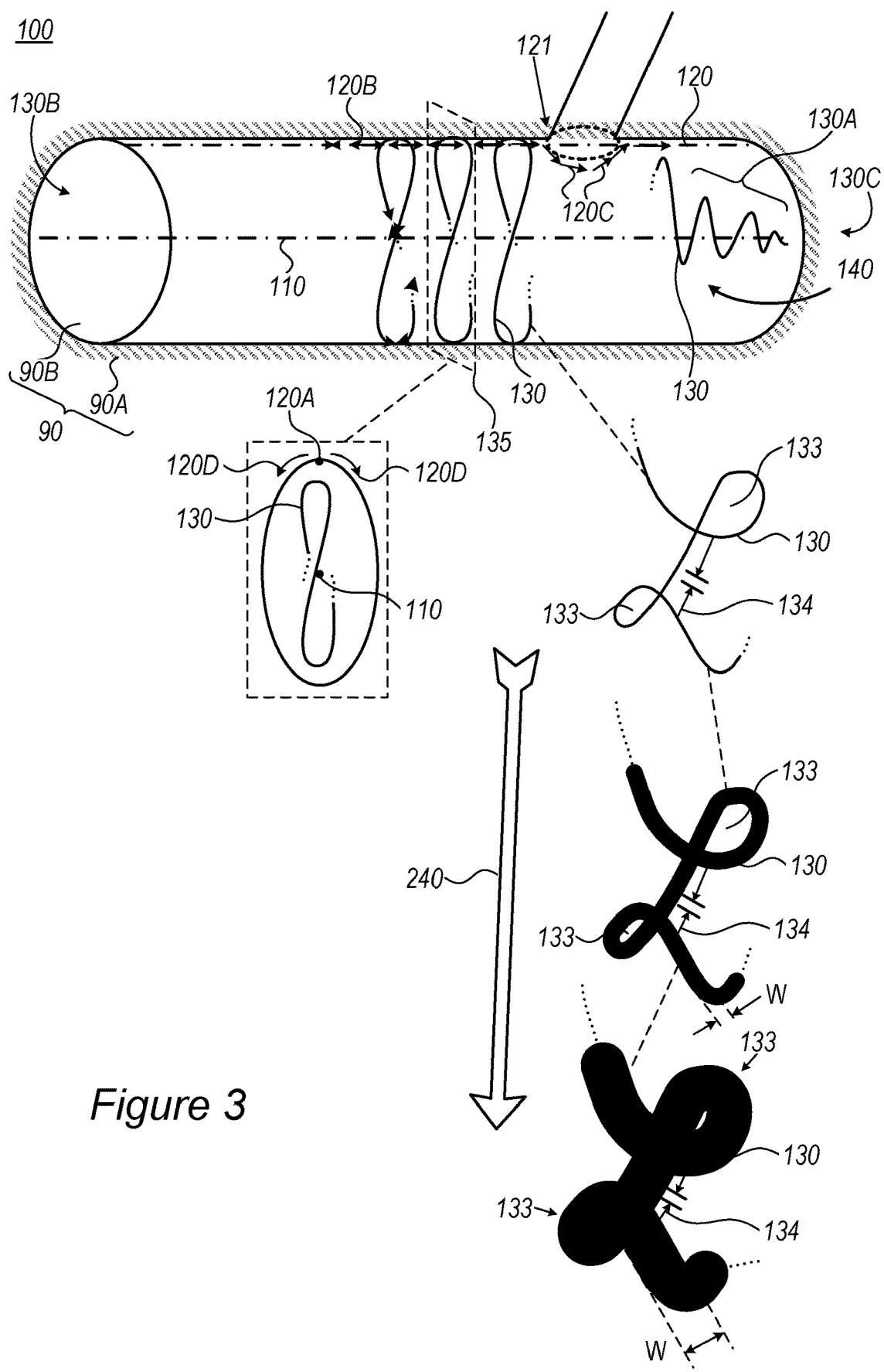
Figure 4:
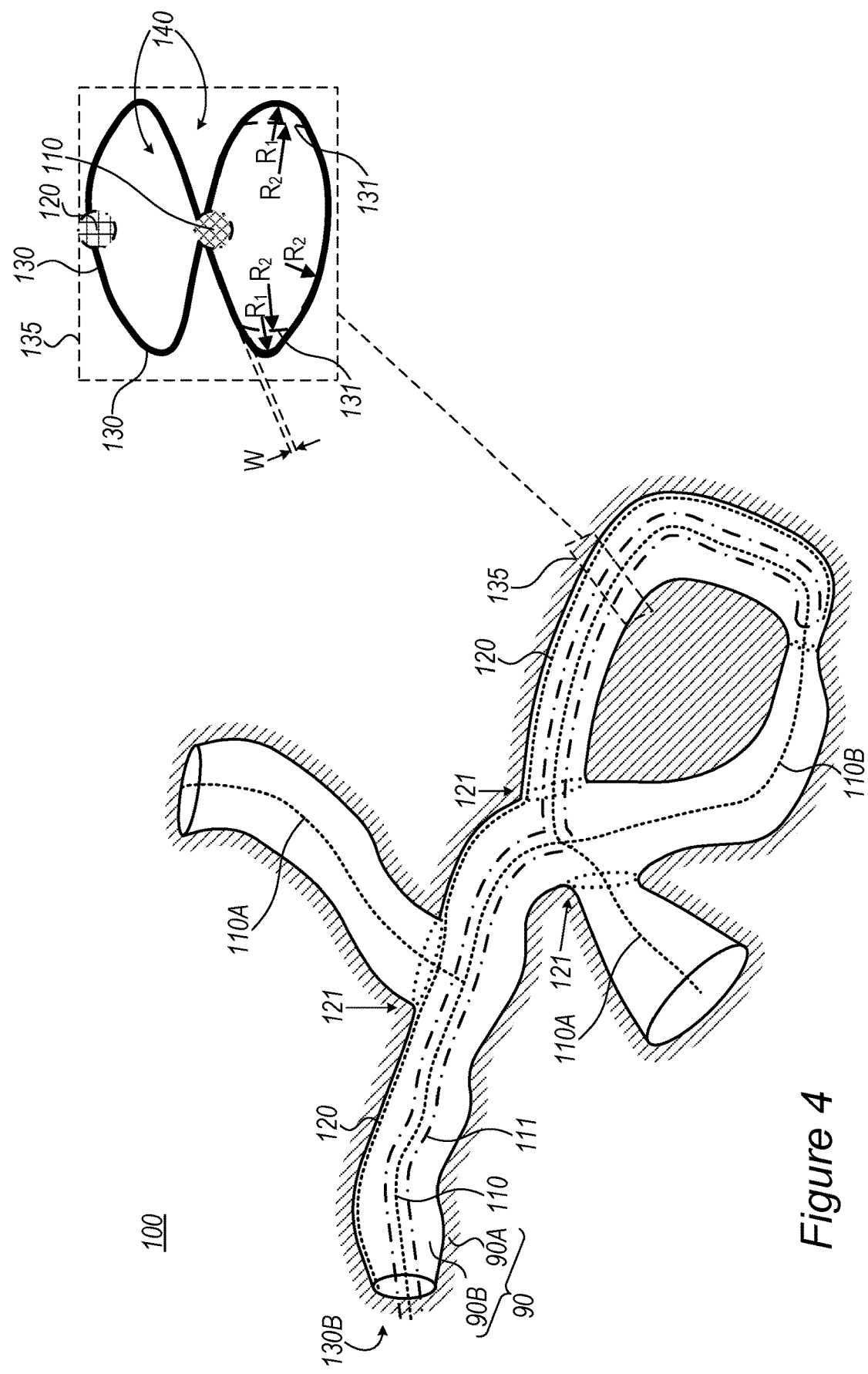

FIGS. 1-4 are high-level schematic illustrations of the derivation of an extractable support material thread 130 printed within a hollow 3D object model 90, according to some embodiments of the invention. FIGS. 1-4 illustrate schematically the derivation of threads 130 within various 3D object models 90, such as spiral object 90 illustrated in FIG. 1, bottle-like object 90 illustrated in FIG. 2, and bifurcated object 90 illustrated schematically in FIG. 4. Derived 3D models 100 comprise 3D objects 90, thread 130 and possibly additional filling material 140. FIG. 1 illustrates schematically spiral thread 130 designed in elongated tube model 90, FIG. 2 illustrates schematically thread 130 designed in bottle model 90, FIG. 3 illustrates schematically the derivation of thread 130 and FIG. 4 illustrates schematically the derivation of thread 130 in branched model 90. Cross sections 135 are illustrated in an approximate manner, in the sense that threads 130 are continuous throughout the object model, while in some of the cross sections they are illustrated as closed shapes, e.g., as closed Lissajous curves. It is understood that curves in consecutive cross sections are interconnected to form continuous thread 130 throughout the object. Elements from FIGS. 1-4 may be combined in any operable combination, and the illustration of certain elements in certain figures and not in others merely serves an explanatory purpose and is non-limiting. It is noted that, in the following, numeral 90 designates a hollow object 90, which is usually modeled by a mesh, and often in the form of an STL file (but not limited thereto). In certain embodiments, numeral 90A is used to denote the body of the model, while numeral 90B is used to denote the cavity inside the hollow model, as indicated e.g., in FIGS. 2, 3 and 4.

For example, FIG. 1 illustrates schematically a spiral thread 130 designed within an elongated tube model 90 along a central line thereof, either peripherally as indicated schematically in cross section 135A and/or peripherally and crossing into the center, roughly "8"-like shaped, as indicated schematically in cross section 135B. Thread 130 may have an optimized thickness (denoted by "W") which may be calculated to optimize the ability to remove thread 130 from within elongated tube model 90 after 3D printing it, reducing the risk of tearing or knotting and maximizing the removal of material from within model 90. Cross section 135C illustrates schematically a more curled and thicker thread 130 which fills in hollow object model 90 more completely. Any of the examples in cross sections 135A-C may be combined, either within cross section 135 and/or along central line 110, respectively to object characteristics and requirements concerning the thread material (central line 110 is shown in FIGS. 2, 3 and 4 but omitted from FIG. 1 for clarity, in a non-limiting manner). The intermediate space surrounding thread 130 within object cavity 90B may be filled with filling material 140 (e.g., supporting materials), which may be weaker than the thread material (the filling material may e.g., be gel-like) and may be removed together with the thread upon pulling thread 130. One or both ends 130A of thread 130, e.g., at one or more openings 130B of object 90 and/or at one or more dead ends 130C of object 90 may be designed differently from thread 130, e.g., be narrower to further reduce the tearing risk and/or as cleaning is simpler near the object's ends.

In another example, FIG. 2 illustrates schematically thread 130 designed within a bottle model 90 (with numeral 90A denoting the bottle building material and numeral 90B denoting the cavity within the bottle, which is filled by thread 130 and optionally filling material 140) along a central line 110 thereof and with respect to a reference line 120 along the inner surface of the bottle (defined, e.g., between the bottle building material 90A and the bottle cavity 90B). The challenge in a bottle-like object is the narrow opening (denoted schematically by "d") relative to the broader inner hollow of the object (denoted schematically by "D"). Cross-sections 135A, B illustrate schematically two curvature types of threads 130 that may be designed within the hollow, and with respect to central line 110 and reference line 120, as well as variations of curves 130, e.g., Lissajous curves, as explained below. As in FIG. 1, the cross-section curves are shown schematically, and may be thicker and vary in shape. In the cross sections, a schematic representation of central line 110 and reference line 120 is provided to illustrate the construction of thread curves 130 around central line 110 and in an orientation determined with respect to reference line 120 which provides corresponding reference points for the curve orientation along the object. The curvature radii along thread 130 may be configured to be larger than a specified curvature radius that relates to a tearing risk of the thread. In FIGS. 2 and 4, curvature radii $R_1$ and $R_2$ ($R_1<R_2$) are illustrated schematically and in a non-limiting manner, as the curvature radius changes continuously along the 3D curve of the thread, and also depends on the thread thickness along its length. Thickening the thread may reduce the curvature radius at certain points to reduce the risk of tearing, as illustrated schematically by the broken line 131 in FIG. 4, increasing the curvature radius at the specific point from $R_1$ to $R_2$.

In yet additional examples, FIGS. 3 and 4 illustrate schematically the derivation of central line 110 and reference line 120 for generic hollow object model 90 in FIG. 3 and for branched hollow model in FIG. 4. It is noted that for both objects 90, the object body (made of modelling material) is indicated schematically by numeral 90A, while the cavity within the object (to be at least partly filled with thread 130) is indicated schematically by numeral 90B.

Central line 110 of hollow 3D object model 90 may be determined, e.g., by deriving a skeleton of cavity 90B inside 3D object 90A and possibly simplifying the skeleton (indicated schematically by line 111 surrounding the selected portion) according to specified requirements such as curvature radius thresholds, twisting threshold or length threshold, which may be related to the tensile strength of the material(s) forming thread 130. For example, as illustrated schematically in FIG. 4, skeleton sections marked 110A, 110B may be removed from the skeleton when defining central line 110 due to various considerations, such as branching (110A), bending beyond specified thresholds (110B), or loops (demonstrated schematically in part by 110B) that may cause thread 130 to tear upon extraction from the 3D-printed object. For example, central line 110 may be defined as the longest section of the skeleton, without branching or severe bending that exceeds a specified measure of bending. In certain embodiments, the skeleton may be derived by algorithms which represent 3D object 90 as being composed of approximately cylindrical sections, calculate the axis of each section, and connect the axes, e.g., with respect to angles between the sections, into the skeleton of 3D object 90. In some embodiments, the skeleton may be simplified into the central line by removing bifurcations and/or loops, or by finding a longest part of the skeleton which does not bend beyond a specified threshold. Such simplifications may be related to the tensile strength of the material(s) forming thread 130 in order to avoid the risk of tearing the thread while removing it from the printed object.

In certain embodiments, numerical computation software may be used to calculate the skeleton, e.g., by first converting the shape of cavity 90B into a raster representation, e.g., as voxels of a prespecified resolution, and then using morphological skeletonization or erosion functions such as bwskel and bwulterode in MatLab© to reduce the volume of cavity 90B to corresponding lines. Using related computational tools, the longest path in the skeleton may be calculated by first converting the skeleton to a graph representation, and then using graph object functions to find the most distant node of a graph from a given node at or near some entrance of opening(s) 130B or object 90.

Reference line 120 and/or reference point(s) 120 may be calculated in order to provide a consistent direction or orientation for curve 130, as illustrated schematically in FIG. 3 by points 120A and arrows 120B, 120C and 120D which denote possible orientations of curve 130 that would otherwise be unclear (e.g., if reference line 120 is not determined), derived as explained below. For example, reference line 120 may be calculated along an inner surface of hollow 3D object model 90A, e.g., by maintaining the distance of reference line 120 from central line 110 within specified boundaries, to avoid bifurcations, e.g., bifurcation 121—see e.g., FIG. 3, with reference line 120 denoted by multiple short arrow denoting the stepwise calculation of reference line 120. Maintaining the distance between central line 110 and reference line 120 as not exceeding a specified distance may yield reference lines 120 that continue along the same object branch as central line 110, rather than deviating into other branches of object 90, e.g., by minimizing the maximal distance between the inner surface and the central line. Alternatively or complementarily, reference line or point(s) 120 may be defined as going along the skeleton sections which are parts of central line 110.

In certain embodiments, the following stages may be implemented to derive reference line 120. Starting with an arbitrary cross section 135 of shape 90, an initial point 120A may be selected in the inner surface of object 90B and in cross section 135, e.g., as one of the points on cross section 135 which has a minimal distance to central line 110. Additional points 120A may then be selected with respect to adjacent cross sections 135 in both directions with respect to central line 110 (indicated schematically by the double-headed arrows denoted 120B in the schematic illustration of FIG. 3), and the process may be repeated until an end of central line 110 (e.g., at opening 130B of object 90) is reached. In cases the inner cavity 90B branches 121 (or in other cases such as diameter changes), reference line 120 may be determined as following, indicated schematically by the arrows denoted 120C in the schematic illustration of FIG. 3. Small steps 120C in the construction of reference line 120 may be determined with respect to alternatives (such as in case of branching 121), e.g., by minimizing a function of at least the following factors: (i) the distance of alternative steps 120C to central line 110, (ii) the deviation of direction 120C from the direction of the previous steps 120B or from a weighted accumulation of some previous steps 120B, and (iii) the deviation (denoted 120D) of from the direction of line 110 in the plane of cross-section 135. Reference line 120 may then be constructed from the piecewise linear collection of steps 120B, 120C, optionally smoothed to remove noise by fitting smoother function(s) to it, while constricting reference line 120 to remain inside cavity 90B and/or the surface between object body 90A and cavity 90B.

As further illustrated in FIG. 3, hollow 3D object model 90 may be filled with support material(s) that comprise thread 130 as defined with respect to central line 110 and reference line 120, and possibly with additional filling material 140, e.g., support material(s), to fill in gaps between thread 130 and the inner surface of object model 90 (see, e.g., FIG. 4). Thread 130 may be defined as a curve passing back and forth between central line 110 and the circumference of the inner surface of object model 90, oriented by reference line 120 as a guideline. For example, the curve may be a Lissajous curve, with parameters selected to yield proper filling of the inner cavity of object model 90. The thickness of curve 130 may be determined to avoid contact between adjacent windings of thread 130, e.g., maintaining a minimal distance 134 therebetween and/or maintaining loops 130 in thread 130 open. In the schematic illustration, the process of adjusting the thread thickness (denoted by "W") is indicated schematically in FIG. 3 by numeral 240 (corresponding to the step of assigning the curve thickness along the curve of method 200, illustrated schematically below in FIG. 6) and may proceed, e.g., stepwise or continuously until a corresponding stopping criterion is met. Examples for stopping criteria may comprise e.g., calculating and relating to distances 134, to open windings 133 and/or possibly criteria relating to overall parameters of thread 130 such as total length, total volume, occupancy of the hollow parts of object model 90 (see the 'complementary shape' referred to in FIGS. 5A and 5B below) and/or possibly a model-based estimation of thread parameters, such as derived from an electrical modelling of thread 130 with a resistance parameter used as indicator for expansion of and possibly short circuits in thread 130 that can be used as stopping criterion in determining thread thickness W.

In some embodiments, one or more curves may be defined between central line 110 and the inner circumference (e.g., the inner surface) of object model 90, with respect to reference line 120, e.g., as curve(s) that wind along the inner circumference and/or through central line 110. The curve(s) may be used to define support material thread 130 by assigning a curve thickness along the curve, which converts the curve into material thread 130 that may be 3D-printed with the object. For example, the curve and thread may be defined as a spiral extending along central line 110 at distances defined by reference line 120, as a Lissajous curve extending along central line 110 at distances defined by reference line 120, or possibly as combinations thereof. The definition of the curves of the thread may be carried out automatically, e.g., by adjustment of curve parameters to specific object models 90.

In certain embodiments, a plurality of reference points 120 may be used to derive thread 130, in place or in addition to reference line 120 or parts thereof. In case several candidate reference points 120 match the specified derivation criteria, a subset of points 120 may be selected (e.g., randomly) and used for the thread derivation.

In some embodiments, curve (or thread) thickness may be assigned with respect to distances between adjacent thread windings, e.g., thread thickness may be defined as not exceeding half, or somewhat less than half of distance 134 between adjacent thread windings and/or as maintaining a specified extent of open windings 133. In some embodiments, curve (or thread) thickness may be assigned with respect to a specified curvature radius defined according to a tensile strength of specified material forming the thread, wherein the thickness is defined to exceed the specified curvature radius along thread 130. Thread thickness may be defined by a combination of the embodiments described above.

In some embodiments, filling the cavity in the 3D object beyond thread 130 may be carried out with filling material 140, e.g., support material(s), that has a tensile strength which is lower than that of thread 130, which may then be removed along with thread 130 and/or cleaned after extraction of thread 130. In certain embodiments, ends 130A of thread 130 may be further adjusted, with respect to their shape and/or thickness (e.g., have smaller radii or be thinner), to enable easier extraction of thread 130. Alternatively or complementarily, more filling material 140 may be deposited at ends 130B and/or 130C of object 90 than in its more central parts, as it may be simpler to remove filling material 140 from object openings 130B and/or object dead ends 130C than from its internal regions. For example, referring to FIGS. 1-4, object opening(s) 130B may connect to cavity 90B, and cleaning filling material 140 after performing the 3D printing process may be simple and not necessarily require thread 130 to fill a large portion of cavity 90B in order to remove the support material(s) therefrom. At thread ends 130A, thread 130 may be shaped in a simpler form than its shape within the rest of cavity 90B, e.g., thread ends 130A may comprise smoother lines leading to the interior of cavity 90B. Alternatively or complementarily, thread ends 130A at object dead ends 130C may be deep inside object cavity 90B and present a higher risk of tearing or be more difficult to remove if torn. Accordingly, thread ends 130A at object dead ends 130C may also be reduced in complexity. Either or both features may be implemented by controlling the extent and breadth of thread 130 in any cross section 135 along object 90 as a function of position of cross section 130 along central line 110.

Figure 5A:
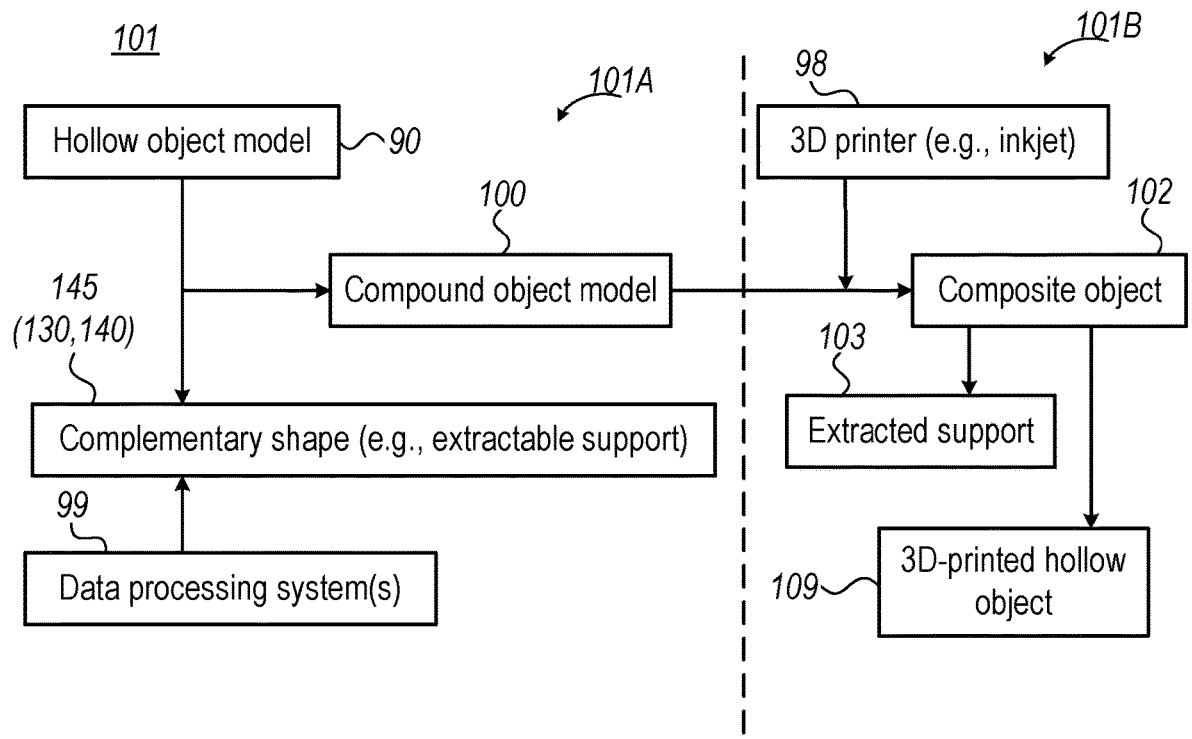
FIG. 5A is a high-level schematic block diagram illustrating the design of support for hollow object models and the production of hollow objects therefrom, according to some embodiments of the invention.

FIG. 5A is a high-level schematic block diagram illustrating the design of support for hollow object models 90 and the production of hollow objects therefrom, according to some embodiments of the invention. The design scheme is indicated by numeral 101, which may denote a 3D-printing system in general lines. The left-hand side of FIG. 5A describes the realm of the intangible (denoted by 101A). Using the input description of an object model 90 to be printed, usually as a mesh, and often as a STL file, a data processing unit 99 may be configured to process input 90 according to some parameters described herein to produce descriptions of thread 130 and other support elements 140, jointly denoted by numeral 145—which are to be printed as inner support of object 90 to yield compound object model 100 to be printed. The right-hand side of FIG. 5A describes the realm of the tangible (denoted by 101B). 3D printer 98 prints a composite tangible object 102 from its description as compound object model 100. Then the extractable materials 103, printed according to the description of complementary shape 145, are extracted from composite object 102, leaving a hollow physical object 109 that is described by hollow object 90.

Figure 5B:
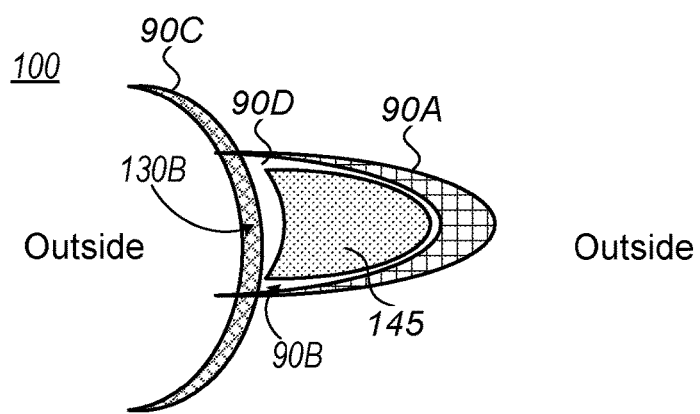
FIG. 5B is a high-level schematic illustration of the definition of spatial compartments with relation to the object model, according to some embodiments of the invention.

FIG. 5B is a high-level schematic illustration of the definition of spatial compartments with relation to object model 90, according to some embodiments of the invention. FIG. 5B provides a schematic two-dimensional cross section of model 90 and its spatial surroundings. In some embodiments, given the geometry or shape of hollow object 90 to be printed, complementary shape 145 may be created in the shape of hollow cavity 90B, e.g., as a support for 3D printing hollow object model 90.

Complementary shape 145 may be derived by the following steps: (i) The obtained description of model 90, usually in the form of a mesh, and often by means of an STL file, provides a distinction between an outside spatial region (including the outside of model 90 and its internal cavity 90B) and an inside spatial region of object model 90 (including the object body 90A). (ii) one or more lids 90C, e.g., expressed as additional mesh(es) may be applied to close corresponding opening(s) 130B of the shape in model 90—providing a clear distinction between an "outside" (indicated schematically in FIG. 5B) and the spatial region taken by object 90, including cavity 90B and lid(s) 90C. Specifically, the cavity region 90B may be defined by being delimited by the original mesh (of object model 90) and lid(s) 90C.

In certain embodiments, the inner surface of object model 90 may be eroded, or taken back by a few millimeters, to form some space 90D between object model 90 and cavity 90B in which the support is designed, to form a safeguard to prevent thread 130 from touching the internal surface of printed object 109 by some error or inaccuracy of calculation (spatial region 90D may be filled e.g., with filling material 140, or a check may be run to verify thread 130 does not enter spatial region 90D, the latter may be then constructed from building material).

The user or data processing system(s) 99 may select parameters for complementary shape 145, e.g., one comprising thread 130 and possibly filling material 140, such as shape parameters (e.g., resembling a thread, a lace, a chain, a spring or a cork screw), parameters of the selected shape (e.g., the number of turns per unit length for a spiral, spring or cork screw, Lissajous parameters, thickness of thread or lace, etc.), fill factors of different materials (e.g., a percentage of thread material to be pulled and a percentage of filling material 140, e.g. surrounding the thread), the volume of complementary shape 145 within object cavity 90B, as controlled for example by the optional erosion of object model 90A and ensuing extension of cavity 90B as described above, a required degree of extraction reliability, which may be determined empirically as a function of the other parameters, and so forth.

Figure 5C:
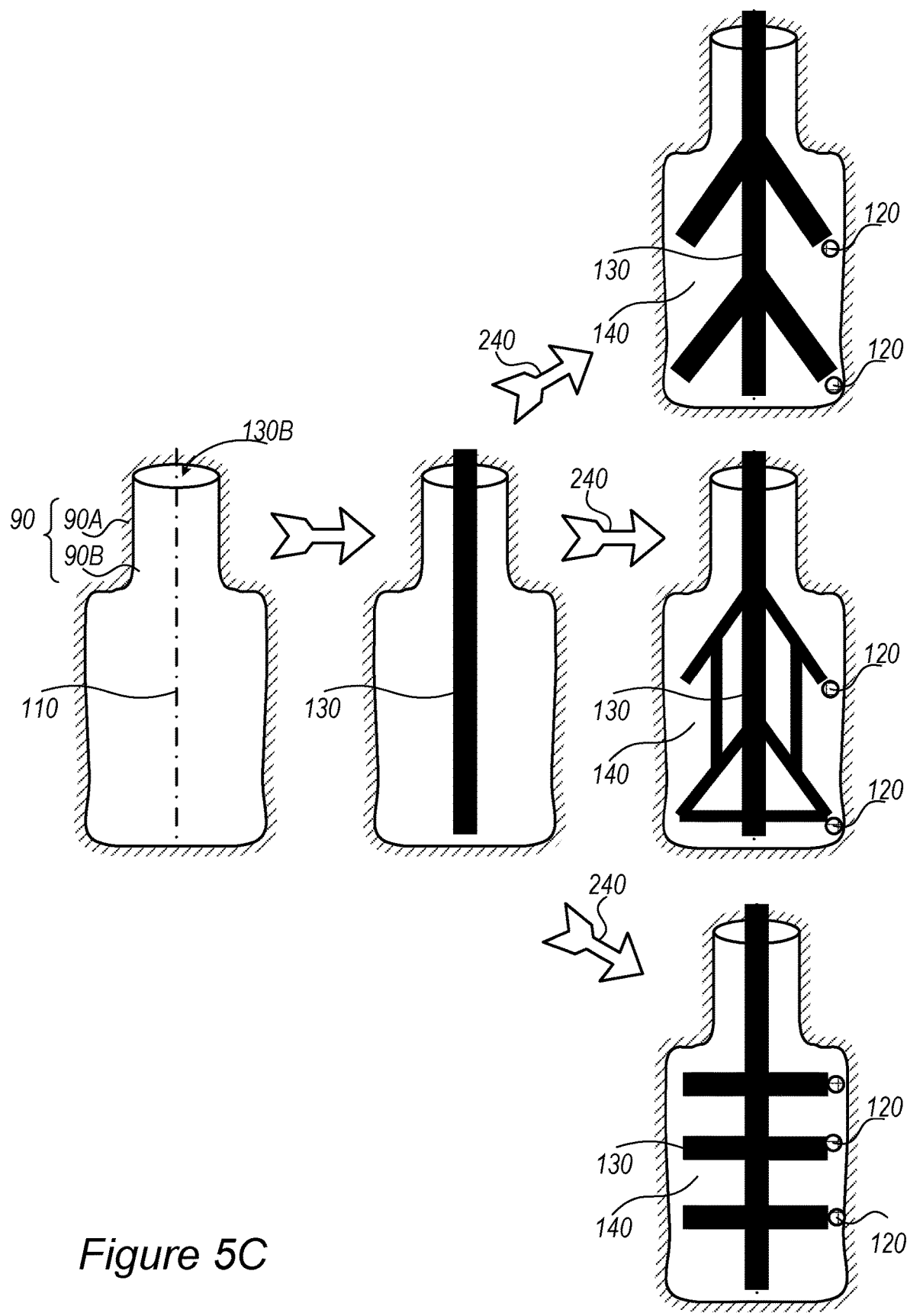
FIG. 5C is a high-level schematic illustration of an alternative method of deriving the thread, according to some embodiments of the invention.

FIG. 5C is a high-level schematic illustration of alternative methods of deriving thread 130, according to some embodiments of the invention. Alternatively or complementarily, thread 130 may be derived, at least partly, according to the following steps, using one or more reference points 120 rather than continuous reference line 120. In certain embodiments, thread 130 may be formed using a combination of stages disclosed herein (e.g., reference line 120 may be used only in part of object, or as providing initial or final stages of deriving thread 130). For example, following a determination of the entry point of complementary shape 145 into cavity 90B of hollow object model 90, a skeleton 110 of the complement shape 145 (represented in the illustration in FIG. 5C, in a non-limiting manner, as a central line) may be calculated automatically, e.g., with the first point of the skeleton being assigned to the entry point to the hollow cavity, e.g., at opening 130B, and other points calculated as described above for example through a raster representation of the shape defined by object model 90—to yield initial thread 130. Initial thread 130, or selected parts thereof, may then be expanded in various ways (illustrated in three non-limiting examples, denoted by stage 240), e.g., using either mesh-based or raster-based methods. In certain embodiments, initial thread 130 may be expanded by adding branches to it, with reference to calculated reference point(s) 120, which may be used to determine the ends of the branches, and possibly additional parameters such as divergence angles from initial thread 130, density of occupation of the inner hollow by thread 130 with branches, etc. In certain embodiments, initial thread 130 may be further expanded by interconnecting branches with one or more connections, illustrated schematically in the middle embodiment on FIG. 5C. Locations, density and other parameters of the connections may be determined according to reference point(s) 120 and/or additional parameters. In certain embodiments, branches of thread 130 may be designed to have different angles, depending e.g., on the form of object 130, the strength of thread material, estimated forces that may act on thread 130 during its extraction from object 90, etc. In an example, in raster form, the skeleton (initial thread and added branches 130) may be thickened by dilation to a desired thickness, for example using morphological operators of numerical computation software.

In certain embodiments, points of complementary shape 145 may be used to define the placement of the model of complementary shape 145 within object model 90. Complementary shape 145 may be formed from a shape constructed with respect to the skeleton, which is then thickened by dilation to the desired thickness, optionally while avoiding cross links between its voxels—and consecutively formed as a mesh or as a raster or in any required format for the printing process. Object model 90 and complementary shape 145 may then be merged into printable object model 100, and upon completion of its 3D printing as composite object 102, the complementary shape may be pulled to remove the support, yielding extracted support 103, from the printed object, yielding 3D-printed hollow object 109.

In a non-limiting example, thread 130 may be formed from the skeleton, e.g., by advancing along the skeleton and defining thread points as filling complementary shape 145 (or a certain portion thereof e.g., 100%, 90%, 80%, 70% etc.), e.g., by branching, or with respect the defined curves—by forming a small angle of rotation between sequential points on complement shape 145 relative to the current direction of the skeleton as an axis (central line 110), in order to reduce the risk of tearing or knotting complement shape 145 upon extraction from object 109—below a specified threshold relating to the tensile strength of the complement shape material(s).

In various embodiments, object 109 may be made of rigid modeling material and/or of soft, possibly flexible modeling material. In certain embodiments, object 109 may comprise flexible modeling material, and thread 130 of complementary shape 145 may be used to enable, or simplify the removal of internal support material/s from within the hollow object. The modeling material forming the object may be stronger, e.g., more rigid, tougher, etc. than one or more material/s used to form complementary shape 145 including thread 130, to avoid damage to object 109 while extracting support 103 (designed according to complementary shape 145), e.g., by pulling thread 130 out of object 109 after the 3D printing is complete.

In certain embodiments, the algorithm for designing thread 130 (and/or complementary shape 145) may be configured to prevent knots from forming in the thread, to facilitate extraction without tearing the material being extracted. Thread 130 (and/or complementary shape 145) may be designed as a folded shape along central line 110, possibly covering more or less parallel distances from central line 110 and guided by reference line 120, following the inner side (i.e. inner surface) of the external object walls.

Certain embodiments may comprise composite (compound) 3D-printed object 102 comprising hollow 3D-printed object 109 which corresponds to given hollow 3D object model 90, and 3D-printed support material 103 (such as complementary shape 145) filling hollow 3D printed object 109. Support material 103 comprises thread 130 made of a support material having a tensile strength that enables pulling thread 130 out of hollow 3D-printed composite object 102 without tearing thread 130, as well as optionally filling material 140 having a tensile strength lower than the material(s) forming the thread. In various embodiments, thread 130 may be defined with respect to central line 110 of hollow 3D object model 90 and reference line 120 along the inner surface of hollow 3D object model 90. Thread 130 may follow a curve, which may be a spiral, or a Lissajous curve or a combination thereof, and wind back and forth between central line 110 and reference line 120. Thread may have a thickness selected to fill at least 50% (or possibly 70%, 80% or 90%) of hollow 3D-printed object 109 by thread 130, and to maintain a curvature radius of thread 130 below a specified curvature radius that relates to a tearing risk of thread 130.

It is noted that elements from FIGS. 1, 2, 3, 4 and 5A-5C and the related disclosure may be combined in any operable combination, with the illustration of certain elements in certain figures and not in others merely serving an explanatory purpose and is non-limiting.

Figure 6:
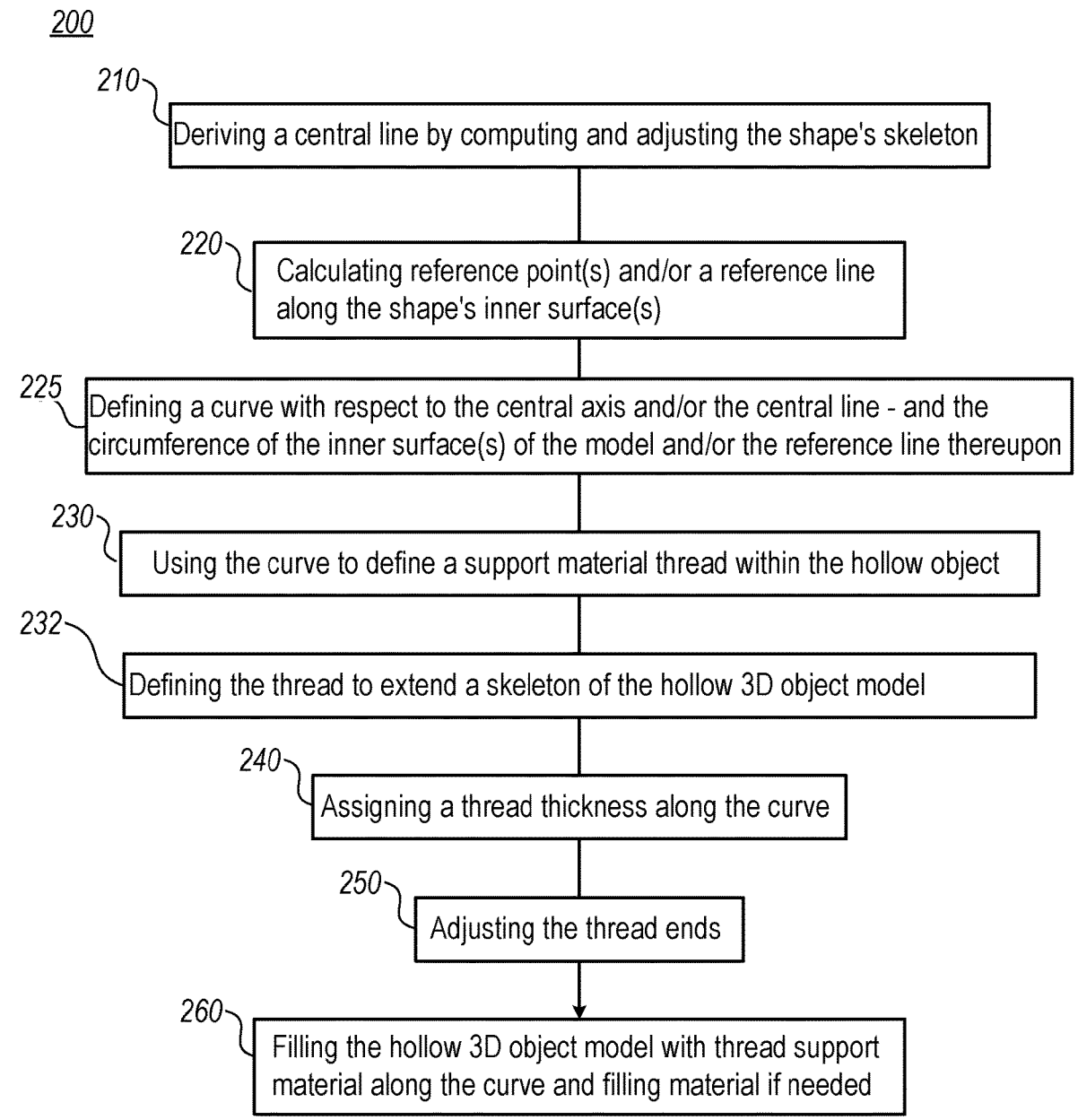
FIG. 6 is a high-level flowchart illustrating a method, according to some embodiments of the invention.

FIG. 6 is a high-level flowchart illustrating a method 200, according to some embodiments of the invention. The method stages may be carried out with respect to a 3D modelling system and 3D object models described above, which may optionally be configured to implement method 200. Method 200 may be at least partially implemented by at least one computer processor, e.g., in a 3D-printing module. Certain embodiments comprise computer program products comprising a computer readable storage medium having computer readable program embodied therewith and configured to carry out the relevant stages of method 200. Method 200 may comprise the following stages, irrespective of their order.

Method 200 comprises deriving a central line of a hollow 3D (three dimensional) object model (stage 210), e.g., by deriving a skeleton of the 3D object and simplifying the skeleton according to specified requirements such as curvature radius thresholds, twisting threshold or length threshold, which may be related to the tensile strength of the material forming the thread; calculating one or more reference point(s) and/or a reference line along an inner surface (or inner surfaces) of the hollow 3D object model (stage 220), e.g., by maintaining the distance of the reference line from the central line within specified boundaries, to avoid bifurcations, or by selecting reference points according to specified criteria such density, relation to the object mesh or other; and filling the hollow 3D object model with support material that comprises a thread defined with respect to the central line and the reference line, and filling material (stage 260), wherein deriving 210, calculating 220 and/or filling 260 may be carried out by at least one computer processor.

In some embodiments, the skeleton may be derived 210 by algorithms which represent the 3D object as composed of approximately cylindrical sections, calculating the axis of each section, and connect the axes, e.g., with respect to angles between the sections, into a skeleton of the 3D object. In some embodiments, the skeleton may be simplified into the central line by removing bifurcations and/or loops, or by finding a longest part of the skeleton which does not bend beyond a specified threshold. Such simplifications may be related to the tensile strength of the thread material in order to avoid the risk of tearing the thread while removing it from the printed object.

In certain embodiments, a plurality of reference points may be used to derive the thread. In the case that several candidate reference points match the specified criteria, a subset may be selected randomly and used for the thread derivation.

In some embodiments, the reference line may be calculated 220 by proceeding along the inner surface(s) of the object and keeping within a distance from the central line which avoids bifurcations, e.g., by minimizing the maximal distance between the inner surface and the central line.

In some embodiments, one or more curves may be defined between the central axis and/or line of the object and the circumference of the inner surface of the model, aligned according to the reference line (stage 225), e.g., as curve(s) that wind back and forth between the central line and the reference line.

Certain embodiments comprise using the curve(s) to define a support material thread within the hollow object (stage 230). Alternatively or complementarily, in some embodiments, the thread may be defined to extend a skeleton of the hollow 3D object model (stage 232).

In some embodiments, the thread may be defined to have a chain structure (e.g., as described below with respect to FIGS. 7A, 7B and FIGS. 8A, 8B). In some embodiments, the chain structure may be made of a non-elastomeric material.

The curve(s) may be used to define the support material thread by assigning a curve thickness along the curve (stage 240) which converts the curve into the material thread that may be 3D-printed with the object. For example, the curve and thread may be defined as a spiral extending along the central line at distances defined by the reference line, as a Lissajous curve extending along the central line at distances defined by the reference line, or possibly as combinations thereof. The definition of the curves may be carried out automatically, e.g., by adjustment of curve parameters to specific object models.

In some embodiments, curve (or thread) thickness may be assigned 240 with respect to distances between adjacent thread windings, e.g., thread thickness may be defined as not exceeding half, or somewhat less than half of the distance between adjacent thread windings. In some embodiments, curve (or thread) thickness may be assigned 240 with respect to a specified curvature radius defined according to a tensile strength of specified thread material, wherein the thickness is defined to exceed the specified curvature radius along the thread. Thread thickness may be defined by a combination of the embodiments described above.

In some embodiments, filling the 3D object model beyond the thread may be carried out with a filling support material that has a tensile strength which is lower than that of the thread, which may then be removed along with the thread and/or cleaned after extraction of the thread.

In certain embodiments, the ends of the thread may be further adjusted 250, with respect to their shape and/or thickness, to enable easier extraction of the thread and/or to leave more filling material behind, to make it easier to clean the surfaces of the 3D object near the openings or in dead ends of the object.

FIGS. 7A and 7B show an example of a waveguide 300 prepared according to an embodiment of the invention. Waveguide 300 comprises a body 301 and a hollow space filled with a filling material 302 (e.g. SUP706™, Stratasys Ltd. Rehovot) enclosing a solid chain structure 303. In the present embodiment, chain structure 303 comprises two types of links, support removal links 3031 with multiple crosslinks and a spade-like section, and force transfer links 3032 used to transfer the linear force from one link to the other. Upon pulling chain structure 303 out of waveguide 300, the spade-like sections of removal links 3031 break up large volumes of filling material 302 into chunks, thereby facilitating fast removal of filling material from the hollow space of waveguide 300. Subsequently, residues of filling material 302 can be easily and rapidly cleaned up from the hollow space of waveguide 300 via one or more additional mechanical and/or chemical processes.

FIGS. 8A and 8A show an example of a bottle 400 prepared according to an embodiment of the invention. Bottle 400 comprises a body 401 and a hollow space filled with a filling material 402 (e.g. SUP706™, Stratasys Ltd. Rehovot) enclosing a solid chain structure 403. In the present embodiment, chain structure 403 comprises links 4031 having multiple crosslinks and a cage design to improve breaking up of filling material 402. Upon pulling chain structure 403 out of bottle 400, the cage sections of links 4031 break up large volumes of filling material 402 into chunks that are removed from the hollow space of bottle 400. Subsequently, residues of filling material 402 can be easily and rapidly cleaned up from the hollow space of bottle 400 via one or more additional mechanical and/or chemical processes.

In some embodiments, the chain structure (e.g., such as chain structure 303 described above with respect to FIGS. 7A and 7B and/or chain structure 403 described above with respect to FIGS. 8A and 8B) may be made of a non-elastomeric material.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram or portions thereof.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for creating an internal support construction in a hollow 3D object model, said method comprising:
   computing a skeleton of the hollow 3D object model by:
   (i) representing the hollow 3D object model with approximated cylindrical sections;
   (ii) calculating the axis of each of the approximated cylindrical sections; and
   (iii) connecting the calculated axes;
   deriving a central line of the hollow 3D object model, by simplifying the computed skeleton according to specified requirements including at least one of curvature radius thresholds, twisting threshold and length threshold;
   calculating a reference line along an inner surface of the hollow 3D object model, by maintaining a distance of the reference line from the central line within specified boundaries; and
   creating the internal support construction by filling the hollow 3D object model with support material that comprises a thread defined with respect to the central line and to the reference line, and with filling material surrounding the thread,
   wherein said method is carried out by at least one computer processor.

2. The method of claim 1, further comprising defining the thread as a curve that winds back and forth between the central line and the reference line.

3. The method of claim 1, further comprising defining the thread as a spiral extending along the central line at distances defined by the reference line.

4. The method of claim 1, further comprising defining the thread as a Lissajous curve extending along the central line at distances defined by the reference line.

5. The method of claim 1, further comprising defining the thread to extend the skeleton of the hollow 3D object model.

6. The method of claim 1, further comprising defining a thickness of the thread with respect to distances between adjacent thread windings.

7. The method of claim 6, wherein the thickness is defined with respect to at least one parameter relating to a whole of the thread.

8. The method of claim 1, further comprising defining a thickness of the thread with respect to a specified curvature radius according to a tensile strength of the support material forming the thread.

9. The method of claim 8, wherein the thickness is defined with respect to at least one parameter relating to a whole of the thread.

10. The method of claim 1, further comprising filling gaps between the hollow 3D object model and the thread with a filling material, wherein the filling material has a tensile strength which is lower than that of the thread.

11. The method of claim 1, wherein the thread has a chain structure.

12. The method of claim 11, wherein the chain structure is made of a non-elastomeric material.

* * * * *